Jan. 27, 1931.  F. W. SCHRAMM  1,790,076
AUTOMATIC VOLTAGE REGULATING CIRCUIT
Filed Aug. 25, 1928
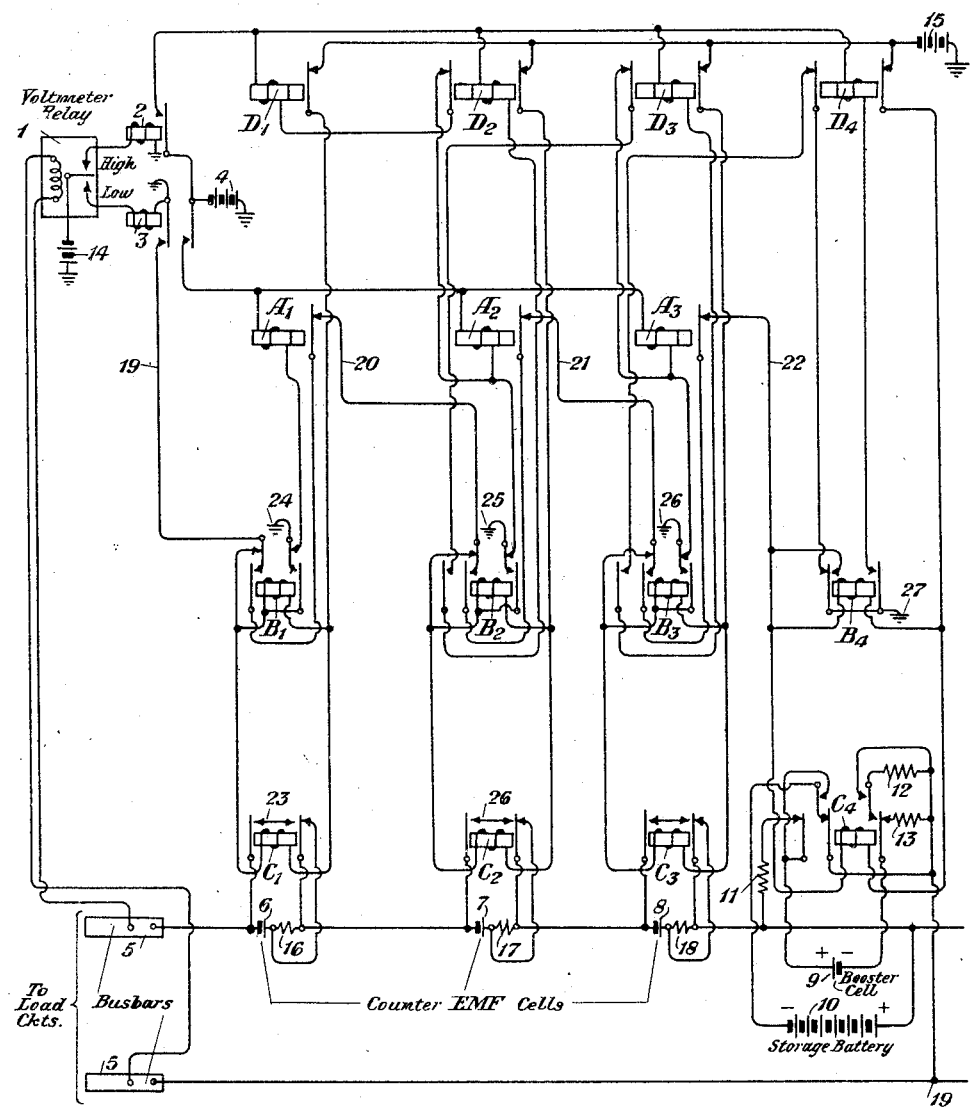
INVENTOR
F. W. Schramm
BY
ATTORNEY

Patented Jan. 27, 1931

1,790,076

UNITED STATES PATENT OFFICE

FRED W. SCHRAMM, OF BROOKLYN, NEW YORK, ASSIGNOR TO AMERICAN TELEPHONE AND TELEGRAPH COMPANY, A CORPORATION OF NEW YORK

AUTOMATIC VOLTAGE-REGULATING CIRCUIT

Application filed August 25, 1928. Serial No. 301,976.

This invention discloses a novel voltage regulating circuit for automatically maintaining within narrow limits the bus-bar voltage of a source of potential. The circuit comprises a system of relays controlling a plurality of similar voltage adjusting elements for varying the bus-bar voltage in equal steps, said system of relays in turn being controlled by a voltmeter relay connected between the bus-bars. When for any reason the bus-bar voltage exceeds the limits set, the regulating circuit automatically operates to vary the voltage in successive steps through the medium of the adjusting elements until the initial voltage is again restored.

Such a regulating system finds application, for example, in power plants supplying variable loads where the bus-bar voltage varies as the load changes due to the resistance of the supply leads or internal resistance of the source of potential or to variations in magnitude of the generated voltage.

The circuit operation is best explained by reference to the attached drawing, which shows the circuit as applied to a storage battery power plant employing counter E. M. F. and booster cells for varying the bus-bar voltage. The circuit is arranged to short circuit in consecutive steps the counter E. M. F. cells and to connect in the booster cell as the bus-bar voltage drops, and as the voltage rises, to disconnect the booster cell and reinsert the counter E. M. F. cells in the reverse order.

Referring to the drawing, the storage battery source of potential is shown at 10, with the counter E. M. F. cells 6 to 8, inclusive, normally in series therewith. The booster cell 9 is normally connected in a trickle charging circuit, as explained below.

The controlling element in the circuit is the voltmeter relay 1, whose operating winding is connected between the bus-bars 5, the voltage of which is to be regulated. The voltmeter relay maintains the bus-bar voltage between narrow limits through control of the other relay means shown, being so adjusted that the armature makes contact with the "low" stud while the lower voltage limit is exceeded, and with the "high" stud while the bus-bar voltage exceeds the upper limit.

Assume that all relays are released, which is the condition for minimum load, and that a considerable load is then connected to the bus-bars. The heavy current flowing through the battery 10 will cause a fall in the bus-bar voltage which in turn will operate the armature of relay 1 against the low stud, thus operating relay 3 on a circuit from battery 14, through the contact of relay 1 and winding of relay 3 to ground. The operation of relay 3 in turn causes the operation of relays $A_1$, $B_1$ and $C_1$. For relay $A_1$ the circuit is traced from battery 4, through the outer front contact of relay 3, winding of relay $A_1$, right back contact of relay $B_1$ to ground at 24. For relays $B_1$ and $C_1$, the circuit is from battery 15, through the back contact of relay $D_1$, windings of relays $B_1$ and $C_1$, in parallel, left back contact of relay $B_1$, over lead 19 to ground through the inner front contact of relay 3.

The operation of relay $C_1$ connects the short circuiting path 23 around the counter E. M. F. cell 6, thus increasing the bus-bar voltage by an amount equal in magnitude to that of the cell. The operation of relay $B_1$ transfers the ground obtained over lead 19 from the windings of $B_1$ and $C_1$ to the armature of relay $A_1$, through the left front contact of relay $B_1$. Relays $B_1$ and $C_1$, however, remain operated due to the fact that the windings of these relays obtain a new ground upon operation of $B_1$, through the right front contact of relay $B_1$ to ground at 24. The operation of relay $B_1$ further disconnects the ground 24 from the winding of relay $A_1$ at the right back contact of relay $B_1$. Relay $A_1$, however, is slow release and hence does not release until the armature of relay 1 has had time to move off the low contact, thus removing the ground on lead 19, in the event that the short circuiting of cell 6 has restored the bus-bar voltage within the specified limits, which for the present is assumed to be the case.

The purpose of relay $A_1$ then is to prevent the ground on lead 19 from being connected to the windings of relays $B_2$ and $C_2$ over lead 20 through the back contacts of relay $A_1$, until the armature of the voltmeter relay has had time to move off of the low contact in case the bus-bar voltage is restored within the specified limits by the operation of relay $C_1$. Were it not for this arrangement relays $B_2$ and $C_2$ would operate and short circuit cell 7 as is explained below, as soon as $B_1$ operated, thus increasing the bus-bar voltage by too great an amount.

With relays $B_1$ and $C_1$ locked to ground at 24 and with relay $A_1$ released, assume that the bus-bar voltage again falls. The armature of relay 1 will again be operated against the low contact reoperating relay 3. The operation of relay 3 will connect battery 4 to the windings of the A relays. Relay $A_1$, however, will not operate due to the fact that its operating circuit is open at the right back contact of relay $B_1$, which latter is operated. Relay $A_2$, however, operates on the circuit from battery 4 through the winding of $A_2$ to ground at 25 through the right back contact of relay $B_2$. The operation of relay 3 also connects ground over lead 19, through the left front contact of relay $B_1$, back contact of relay $A_1$, and over lead 20 to the windings of relays $B_2$ and $C_2$, in parallel, the other side of the windings being connected to battery 15 through the back contact of relay $D_2$.

Relays $B_2$ and $C_2$ operate over this circuit. The operation of relay $C_2$ replaces cell 7 with short circuiting path 26, thus increasing the bus-bar voltage. The operation of relay $B_2$ disconnects the ground obtained over lead 20 from the windings of $B_2$ and $C_2$ at the left back contact of $B_2$ and connects lead 20 to the armature of relay $A_2$ through the left inner front contact of relay $B_2$. The operation of relay $B_2$ also disconnects ground 25 from the winding of relay $A_2$, and reconnects ground 25 to the windings of $B_2$ and $C_2$ through the right front contact of $B_2$, thus holding these relays operated. Relay $A_2$ serves the same purpose as $A_1$ and upon disconnection of ground 25 therefrom due to the operation of relay $B_2$, relay $A_2$ remains operated sufficiently long to permit the armature of relay 1 to move off the low stud, assuming the voltage now restored to the proper value, thus preventing the ground on lead 20 from being connected to the windings of relays $B_3$ and $C_3$ over lead 21. But for this slow release feature relays $B_3$ and $C_3$ would operate immediately and by shunting out cell 8 would cause too great an increase of the bus-bar voltage.

Upon a further decrease in bus-bar voltage relay 1 again operates against the low stud connecting battery 4 to the A relays. Relays $A_1$ and $A_2$ are not affected since their operating circuits are open at the corresponding B relays which are locked up. Relay $A_3$ operates to ground at 26. The operation of relay 1 also causes ground to be applied to lead 19. The ground on lead 19 is applied through the left operated contacts of relay $B_1$ and back contact of $A_1$ to lead 20, and in turn through the left front contact of $B_2$ and back contact of $A_2$ to lead 21 and through the left inner back contact of relay $B_3$ to the windings of relays $B_3$ and $C_3$ in parallel. Battery 15 is applied to the other side of these windings through the back contact of relay $D_3$, causing $B_3$ and $C_3$ to operate. Thus cell 8 is short circuited and lead 21 connected through to lead 22 after release of relay $A_3$.

The further operation of relay 1 against the low stud connects the ground at battery 4 over leads 19, 20, 21 and 22 to the $B_4$ and $C_4$ relays, causing their operation on battery 15 supplied through the back contact of relay $D_4$. Relays $B_4$ and $C_4$ are locked to ground at 27, while the operation of relay $C_4$ connects booster cell 9 in series with battery 10. Battery 9 is normally connected across the bus-bars in like polarity with battery 10, as will be seen by tracing the circuit from point 19 through resistance 13 and right back contact of relay $C_4$, through cell 9 from minus to plus, through the left outer back contact of $C_4$ and resistance 11 to the other side of the line. The circuit for battery 10 is traced from point 19, through the left inner back contact of relay $C_4$, through battery 10 from minus to plus to the other side of the line. Resistance 11 is a trickle charging resistance which permits battery 10 to slowly charge up battery 9 while relay $C_4$ is released. Resistances 12 and 13 are inserted in the contact leads of relay $C_4$ to prevent a dead short circuit being connected momentarily across cell 9 during the switching operation which occurs when relay $C_4$ operates.

Returning now to the voltage regulation, when relay $C_4$ operates as explained above, a circuit is traced from point 19 through the right front contacts of $C_4$, through battery 9 from minus to plus, through the left front contact of $C_4$, through battery 10 from minus to plus to the other side of the line. Thus battery 9 is connected in series with 10 and the bus-bar voltage correspondingly increased, causing the armature of relay 1 to return to neutral, assuming the proper bus-bar voltage to be attained. This constitutes the last voltage increase adjustment. If the bus-bar voltage again falls, causing relay 1 to operate against the low stud, no further change will occur.

Assume on the other hand that the voltage now rises, causing the armature of relay 1 to make contact with the high stud. Relay 2 will operate from battery 14, supplied through the contacts of relay 1. The operation of relay 2 connects battery 4 to the windings of the D relays through the front contact of relay 2. Relays $D_1$ to $D_3$, inclusive, however, are not operated due to the fact that for each such relay, the operating circuit is traced from the winding of the D relay in question, through the left back contact of the next higher numbered D relay and through the right back contact of the corresponding B relay to ground. Thus, in the case of relay D, the operating circuit is traced from the winding of $D_1$ through the left back contact of $D_2$, right back contact of relay $B_2$ to ground at 25. Under the present assumptions, all the B relays are operated and hence in each case the operating circuits for relays $D_1$ to $D_3$, inclusive, are open at the right back contacts of the B relays.

An operating circuit is complete for relay $D_4$, however, which is traced from battery 4, through the front contact of relay 2, winding of $D_4$, right contact of relay $B_4$, to ground at 27. Relay $D_4$ thereupon operates and disconnects battery 15 from the windings of relays $B_4$ and $C_4$ by opening the operating circuit at the right back contact of $D_4$. Relays $B_4$ and $C_4$ thereupon release. The release of relay $C_4$ disconnects battery 9 from its series connection with battery 10, reconnecting 9 in its trickle charging circuit explained above. The disconnection of battery 9 reduces the bus-bar voltage and, assuming this restores the voltage within proper limits, the armature of relay 1 will move off the high stud.

Meanwhile, the release of relay $B_4$ has opened the holding circuit of relay $D_4$ through the right contacts of $B_4$. Relay $D_4$, however, is slow release and does not release until relay 1 has had time to move off the high stud under the above assumption. Were it not for this slow release feature an operating circuit would be completed for relay $D_3$ causing it to operate immediately as explained below, and remove the short circuit from cell 8 thus reducing the bus-bar voltage by too great an amount.

Assume now that the bus-bar voltage again rises causing relay 1 to be operated against the high stud again connecting battery 4 to the D relays. Relays $D_1$ and $D_2$ will not operate since $B_2$ and $B_3$ are operated. Relay $D_4$ will not operate since $B_4$ is released. Relay $D_3$ operates from battery 4 through the winding of $D_3$, left front contact of relay $B_3$, back contact of relay $D_4$, left back contact of relay $B_4$ to ground at 27. This is the operating circuit that would have been completed prematurely but for the slow release of relay $D_4$ in the circuit operation of the preceding paragraph. The operation of relay $D_3$ disconnects battery 15 from the windings of relays $B_3$ and $C_3$ by opening the circuit at the right contacts of $D_3$. Relays $B_3$ and $C_3$ thereupon release. The release of $C_3$ removes the shunt from around cell 8, reconnecting the cell in series with battery 10 and reducing the bus-bar voltage. The release of relay $B_3$ opens the circuit of $D_3$ at the left outer contacts of $B_3$. Relay $D_3$, however, being slow release remains up sufficiently long for relay 1 to move off the high stud, otherwise relay $D_2$ would operate to ground at 26 causing cell 7 to be reconnected, thus reducing the bus-bar voltage by too great an amount.

The removal of the short circuits from around cells 7 and 6 is similar in operation to that described for cell 8. When relay 1 next operates against the high stud, relay $D_2$ operates bringing about the chain of operations which removes the shunt from cell 7, and when relay 1 again operates against the high stud, relay $D_1$ operates to remove the shunt from cell 6.

It is not necessary, of course, that all the steps involving a voltage change in one direction be traversed before a change in the opposite direction can be obtained. From the explanation given above, it should be clear that at any step in sequence a voltage change in either direction will be automatically compensated by the regulating circuit. If the bus-bar voltage drops, the next step will be operated and if it rises, the last step operated will be released.

If a given change in bus-bar voltage is greater than can be compensated by the operation of one step only, the armature of the voltmeter relay will remain against the high or low stud after the A or D relay, corresponding to such step, has released. In such event the next succeeding step will be operated immediately as was pointed out in the above explanation. And as long as the armature of the relay remains against a given stud, the voltage will be adjusted in a given direction in successive steps until the maximum adjustment is obtained or the armature moves off the stud due to the proper voltage being obtained.

The resistances 16 to 18, inclusive, in series with cells 6 to 8, inclusive, respectively, are current limiting resistances such as are ordinarily provided with such cells to prevent excessive discharge current therefrom while the cells are short circuited.

With the C relays released, these resistances are short circuited through the right back contact of the relays. When, however, a C relay operates, as for example, relay $C_1$, the short circuiting path is removed from resistance 16, and the resistance is connected in series with cell 6 in the local discharge circuit completed through the shunt path including segment 23.

It is evident that the booster cell may be omitted from the circuit shown on the drawing without changing the circuit operation. In fact, the booster cell arrangement is shown as an alternative scheme for voltage regulation. By obvious changes in the circuit, booster cells could be used exclusively in the regulation. Another method of regulation would consist in omitting the booster cell and replacing the counter E. M. F. cells with a series resistances adapted to be short circuited. With such a scheme an increase in load current would cause a drop in the busbar voltage due to the potential drop in these series resistances. The voltage could be raised, of course, by short circuiting the resistances in succession until the desired voltage was obtained. If instead of a storage battery a generator is used as the source of potential, the regulation could be obtained by locating a plurality of resistances in the field circuit thereof and varying the voltage by successively short circuiting and restoring the same.

What is claimed is:

1. Automatic voltage regulating means comprising in combination, a source of potential having associated therewith a plurality of counter E. M. F. cells for adjusting the terminal voltage by fixed steps, a voltmeter relay associated with said potential source for maintaining the terminal voltage within predetermined limits through operation of the armature thereof against one stud when the lower limit is exceeded and against a second stud when the upper limit is exceeded, switching means individual to said counter E. M. F. cells operative while the armature is in contact with either stud to vary the terminal voltage in successive steps in a direction to restore said voltage within said predetermined limits.

2. Automatic voltage regulating means comprising in combination, a source of potential having associated therewith a plurality of counter E. M. F. cells for adjusting the terminal voltage by fixed steps, a voltmeter relay associated with said potential source for maintaining the terminal voltage within predetermined limits through operation of the armature thereof against one stud when the lower limit is exceeded and against a second stud when the upper limit is exceeded, switching means individual to said counter E. M. F. cells operative while the armature is in contact with either stud to vary the terminal voltage in successive steps in a direction to restore said voltage within said predetermined limits, slow acting means associated with said switching means for introducing a time interval between said successive voltage adjustments to permit restoration of said voltmeter relay armature to the neutral position upon readjustment of the terminal voltage within said predetermined limits.

3. Automatic voltage regulating means comprising in combination, a source of potential having associated therewith a plurality of counter E. M. F. cells for varying the terminal voltage in equal steps, a voltmeter relay associated with said potential source for maintaining the terminal voltage within narrow predetermined limits through operation of the armature of said relay against one stud when the lower limit is exceeded and against a second stud when the upper limit is exceeded, relay means individual to said cells operative while said armature is in contact with either stud to vary the terminal voltage in a direction to restore said voltage within said predetermined limits, operating circuits for the relay means associated with a given cell being traced through the contacts of the relay means associated with other cells to insure a sequential operation of the relay means associated with successive elements for varying the terminal voltage in successive steps, slow acting means associated with said relay means for introducing an appreciable time interval between the successive voltage adjustments to permit restoration of said armature to the neutral position upon adjustment of the terminal voltage within said predetermined limits.

4. Automatic voltage regulating means comprising in combination, in series across a pair of output terminals, a source of potential and a plurality of counter E. M. F. cells, a voltmeter relay connected across said terminals having the armature adjusted to the neutral position for the resultant terminal voltage, and adapted to make contact with one stud for a voltage decrease approximating or exceeding in magnitude that of a counter E. M. F. cell, and adapted to make contact with the other stud for an increase of like magnitude, means associated with said first stud operative upon contact of the armature therewith for successively replacing said counter E. M. F. cells with short circuiting paths until the initial terminal voltage is restored, means associated with said second stud operative upon contact of the armature therewith to successively reconnect said replaced counter E. M. F. cells until the initial terminal voltage is restored, said means associated with the studs being further operative upon subsequent contact of the armature with either stud to again adjust the terminal voltage by a like process to its initial value and to continue this process indefinitely for successive voltage fluctuations within the limits of adjustment set by the number and magnitude of the voltage reducing elements.

5. Automatic voltage regulating means comprising in combination, in series between a pair of terminals, a source of potential and a plurality of counter E. M. F. cells for adjusting the terminal voltage in equal steps, a voltmeter relay connected between said terminals adapted to maintain the terminal voltage between predetermined limits by operating the armature thereof against one stud while said terminal voltage exceeds one limit and against the second stud while the other limit is exceeded, means individual to said cells operative while said armature makes contact with one stud to successively replace said cells with short circuiting paths and while said armature makes contact with the other stud to successively reconnect said replaced cells.

6. Automatic voltage regulating means comprising in combination, in series between a pair of output terminals, a source of potential and a plurality of similar counter E. M. F. cells for varying the terminal voltage, a voltmeter relay connected between said terminals and adjusted to maintain the terminal voltage between predetermined narrow limits through operation of the armature against one stud when the lower limit is exceeded and against a second stud when the upper limit is exceeded, relay means individual to said counter E. M. F. cells operative while said armature makes contact with said first mentioned stud to successively replace said cells with short circuiting paths, said relay means being further operative while said armature makes contact with said last mentioned stud to successively remove said short circuiting paths and reconnect said cells, slow acting means associated with said relay means for introducing a time interval between successive voltage adjustments to permit return of said armature to the neutral position upon restoration of said terminal voltage within said predetermined limits.

7. Automatic voltage regulating means comprising in combination, in series between a pair of terminals, a source of potential and a plurality of similar counter E. M. F. cells, a voltmeter relay connected between said terminals for maintaining the voltage between narrow predetermined limits through operation of the armature against one stud when the lower limit is exceeded and against a second stud when the upper limit is exceeded, relay means individual to said cells operative while said armature makes contact with the first stud to successively short circuit said cells and operative while said armature makes contact with the second stud to successively remove said short circuits, slow acting means associated with said relay means to introduce an appreciable time interval between voltage adjustments to permit return of said armature to neutral upon restoration of the terminal voltage within said predetermined limits.

8. Automatic voltage regulating means comprising in combination, a source of potential having associated therewith a plurality of adjusting elements for adjusting the terminal voltage by fixed steps, a voltmeter relay associated with said potential source for maintaining the terminal voltage within predetermined limits through operation of the armature thereof against one stud when the lower limit is exceeded and against a second stud when the upper limit is exceeded, switching means individual to said adjusting elements operative while the armature is in contact with either stud to vary the terminal voltage in successive steps in a direction to restore said voltage within said predetermined limits, said switching means including a chain of relays individual to said adjusting elements for controlling voltage changes in one direction and a second such chain of relays for controlling voltage changes in the opposite direction.

9. Automatic voltage regulating means comprising in combination, a source of potential having associated therewith a plurality of adjusting elements for adjusting the terminal voltage by fixed steps, a voltmeter relay associated with said potential source for maintaining the terminal voltage within predetermined limits through operation of the armature thereof against one stud when the lower limit is exceeded and against a second stud when the upper limit is exceeded, switching means individual to said adjusting elements operative while the armature is in contact with either stud to vary the terminal voltage in successive steps in a direction to restore said voltage within said predetermined limits, said switching means including a chain of relays individual to said adjusting elements for controlling voltage changes in one direction and a second such chain of relays for controlling voltage changes in the opposite direction, slow acting means associated with said switching means for introducing a time interval between said successive voltage adjustments to permit restoration of said voltmeter relay armature to the neutral position upon readjustment of the terminal voltage within said predetermined limits.

10. Automatic voltage regulating means comprising in combination, a source of potential having associated therewith a plurality of adjusting elements for varying the terminal voltage in equal steps, a voltmeter relay associated with said potential source for maintaining the terminal voltage within narrow predetermined limits through operation of the armature of said relay against one stud when the lower limit is exceeded and against a second stud when the upper limit is exceeded, relay means individual to said adjusting elements operative while said armature is in contact with either stud to vary the terminal voltage in a direction to restore said voltage within said predetermined limits, said relay means including a first chain of relays individual to said adjusting elements for controlling voltage changes in one direction, and a second such chain of relays for controlling voltage changes in the opposite direction, operating circuits for the relay means associated with a given adjusting element being traced through the contacts of the relay means associated with other adjusting elements to insure a sequential operation of the relay means associated with successive elements for varying the terminal voltage in successive steps, slow acting means associated with said relay means for introducing an appreciable time interval between the successive voltage adjustments to permit restoration of said armature to the neutral position upon adjustment of the terminal voltage within said predetermined limits.

11. Automatic voltage regulating means comprising in combination, in series between a pair of output terminals, a source of potential and a plurality of similar resistances, a voltmeter relay connected between said terminals for maintaining the voltage between narrow predetermined limits through operation of the armature thereof against one stud when the lower limit is exceeded and against a second stud when the upper limit is exceeded, relay means individual to said resistances operative while said armature makes contact with the first stud to successively short-circuit said resistances and other relay means individual to said resistances operative while said armature makes contact with the second stud to successively remove said short-circuits, slow-acting means associated with said relay means to introduce an appreciable time interval between voltage adjustments to permit return of said armature to the neutral position upon restoration of the terminal voltage within the said predetermined limits.

12. Automatic voltage regulating means comprising in combination, a source of potential having associated therewith a plurality of voltage reducing elements and a plurality of voltage increasing elements for adjusting the terminal voltage by fixed steps, a voltmeter relay associated with said potential source for maintaining the terminal voltage within predetermined limits through the operation of the armature thereof against one stud when the lower limit is exceeded and against a second stud when the upper limit is exceeded, and switching means individual to said voltage increasing and reducing elements and operative while said armature is in contact with either stud to vary the terminal voltage in successive steps in a direction to restore said voltage within said predetermined limits.

13. Automatic voltage regulating means comprising in combination, a source of potential having associated therewith a plurality of voltage increasing elements and a plurality of voltage reducing elements for adjusting the terminal voltage by fixed steps, a voltmeter relay associated with said potential source for maintaining the terminal voltage within predetermined limits through the operation of the armature thereof against one stud when the lower limit is exceeded and against a second stud when the upper limit is exceeded, switching means individual to said voltage increasing elements operative while said armature is in contact with one of said studs to increase the terminal voltage in successive steps to a voltage within said predetermined limits, and switching means individual to said voltage reducing elements operative while said armature is in contact with the other of said studs to reduce the terminal voltage in successive steps to a voltage within said predetermined limits.

14. Automatic voltage regulating means comprising in combination, a source of potential having associated therewith a plurality of voltage increasing elements and a plurality of voltage decreasing elements for adjusting the terminal voltage by fixed steps, a voltmeter relay associated with said potential source for maintaining terminal voltage within predetermined limits through the operation of the armature thereof against one stud when the lower limit is exceeded and against a second stud when the upper limit is exceeded, and switching means operative while said armature is in contact with one of said studs to disassociate in successive steps said voltage reducing elements from said potential source and to associate therewith in successive steps said voltage increasing elements and operative while said armature is in contact with the other of said studs to disassociate in successive steps said voltage increasing elements from said potential source and to associate therewith in successive steps said voltage reducing elements.

15. Automatic voltage regulating means comprising in combination, a source of potential having associated therewith a plurality of adjusting elements for adjusting the terminal voltage by fixed steps, a voltmeter relay associated with said potential source, a plurality of chains of relays, each chain including a control relay, a switching relay adapted to control the association of one of said voltage adjusting elements with said potential source, a first slow-release relay operative while said terminal voltage is being reduced and a second slow-release relay operative while said terminal voltage is being increased, a plurality of circuits interconnecting said relays in such a manner that when the terminal voltage is being reduced, the control relay and the switching relay of each chain are controlled by said first slow-release relay of their own chain, said first slow-release relay of each chain is controlled jointly by said voltmeter relay, the control relay of its own chain and the control relay and said first slow-release relay of the next preceding chain, and said second slow-release relay of each chain is controlled jointly by said voltmeter relay and the control relay of its own chain, and in such manner that when the terminal voltage is being increased, the control relay and the switching relay of each chain are controlled jointly by said voltmeter relay, the control relay and said second slow-release relay of each preceding chain, and said first slow-release relay of their own chain, said first slow-release relay of each chain is controlled jointly by said voltmeter relay, the control relay of its own chain, and said first slow-release relay and the control relay of the next succeeding chain, and said second slow-release relay of each chain is controlled jointly by said voltmeter relay and the control relay of its own chain.

In testimony whereof, I have signed my name to this specification this 23rd day of August, 1928.

FRED W. SCHRAMM.